US007866576B1

(12) United States Patent
Farley

(10) Patent No.: US 7,866,576 B1
(45) **Date of Patent: *Jan. 11, 2011**

(54) FILTERED SHOWER ARM

(76) Inventor: David K. Farley, 1827 Capital St., Corona, CA (US) 92880-1727

( * ) Notice: Subject to any disclaimer, the term of this patent is extended or adjusted under 35 U.S.C. 154(b) by 581 days.

This patent is subject to a terminal disclaimer.

(21) Appl. No.: 11/369,617

(22) Filed: Mar. 7, 2006

Related U.S. Application Data

(63) Continuation-in-part of application No. 10/461,104, filed on Jun. 13, 2003, now Pat. No. 7,097,122.

(51) Int. Cl.

| | |
|---|---|
| ***B05B 1/14*** | (2006.01) |
| ***B05B 1/30*** | (2006.01) |
| ***B05B 15/08*** | (2006.01) |
| ***B01D 27/00*** | (2006.01) |

(52) U.S. Cl. .................... 239/553; 239/575; 239/587.1; 239/587.4; 239/587.5; 210/449

(58) Field of Classification Search ................ 239/553, 239/575, 587.1, 587.3, 587.4, 587.5; 210/282, 210/449

See application file for complete search history.

(56) References Cited

U.S. PATENT DOCUMENTS

| | | | | |
|---|---|---|---|---|
| 4,172,796 | A * | 10/1979 | Corder | 210/238 |
| 4,504,389 | A * | 3/1985 | Rundzaitis | 210/266 |
| 5,022,103 | A | 6/1991 | Faist | |
| 5,152,464 | A | 10/1992 | Farley | |
| 5,300,224 | A | 4/1994 | Farley | |
| 5,503,742 | A | 4/1996 | Farley | |
| 5,795,471 | A * | 8/1998 | Naito | 210/223 |
| 6,016,977 | A | 1/2000 | Farley | |
| 6,187,187 | B1 | 2/2001 | Farley | |
| 6,214,224 | B1 | 4/2001 | Farley | |
| 6,270,023 | B1 | 8/2001 | Farley | |
| 6,325,930 | B2 | 12/2001 | Farley | |
| 6,537,455 | B2 | 3/2003 | Farley | |
| 6,599,428 | B1 * | 7/2003 | Douglas | 210/668 |
| 7,097,122 | B1 * | 8/2006 | Farley | 239/553 |
| 2002/0070293 | A1 * | 6/2002 | Ti | 239/317 |

* cited by examiner

*Primary Examiner*—Len Tran
*Assistant Examiner*—Ryan Reis
(74) *Attorney, Agent, or Firm*—Stetina Brunda Garred & Brucker

(57) ABSTRACT

A combination shower arm and water filter having an integrated design for attachment between a water pipe behind a shower wall and a showerhead. The combination shower arm and water filter including a body having a first hollow arm and a second hollow arm connected to a central cartridge holding portion. The filter holding portion has a central opening with a filter cartridge or element removably held in a hollow chamber formed above the filter holding portion by means of a cap that is removably secured to the an upwardly extending annular portion formed on the filter holding portion. Water entering the combined shower arm and filter assembly through the first hollow arm is directed into the hollow chamber for passage through filter media in the filter cartridge or element before it exits through the second hollow arm and out a showerhead.

23 Claims, 5 Drawing Sheets

FILTERED SHOWER ARM

CROSS-REFERENCE TO RELATED APPLICATION

This application is a Continuation-in-Part of application Ser. No. 10/461,104, entitled FILTERED SHOWER ARM, filed Jun. 13, 2003 now U.S. Pat. No. 7,097,122.

BACKGROUND OF THE INVENTION

1. Field of the Invention

This invention generally relates to filtered shower arms and, more particularly, to a combination shower arm and water filter that is connected directly to a water pipe behind a shower wall to provide a more compact and attractive device that improves showering.

2. Description of the Prior Art

Shower filters for use in conjunction with showerheads and filtered showerheads in showers are known. For example, filters are inserted at ends of shower arms, with showerheads then secured to the filters, or filtered shower heads are attached directly to the ends of shower arms. However, because of the size of the filter and the attached showerhead, and/or the filtered showerhead, they may extend too far into the shower area. Furthermore, the known filters and/or filtered showerheads add weight to the shower arm, which over time may cause problems. Such known filters and filtered showerheads also tend to be costly to manufacture and are not used by some persons because of their size or style. For example, the known filters and filtered showerheads do not always match person's aesthetic taste, and/or the overall décor of a bathroom or shower area. Finally, the known filters and filtered showerheads cannot be used with large, modern showerheads, such as the flower shaped or watering can type, and do not have an integrated feel or look when used with known shower arms.

There are many types of known shower arm. One such shower arm, having an S-shape, and connected to a water pipe behind a wall is shown in U.S. Pat. No. 5,022,103.

Known shower filter and filtered showerhead assemblies are set forth in U.S. Pat. Nos. 5,152,464, 5,300,224, 5,503,742, 6,016,977, 6,187,187, 6,214,224, 6,270,023, 6,325,930 and 6,537,455 to Farley. While the foregoing prior art devices provide improved filtration of hot water passing through them, they do not provide for a filtered shower arm that may be attached or secured between a water line behind a shower wall and a showerhead that reduces cost and weight. The devices of the present invention provides an integrated shower arm and water filter assembly that may be used with any type of showerhead, and which also avoids the need for a separate shower filter and/or shower arm.

Therefore, there exists a need in the art for a less, cumbersome, easy-to-install, lower cost and more aesthetically pleasing combination shower arm and water filter that overcomes known problems.

SUMMARY OF THE INVENTION

Accordingly, it is a general object of the present invention to provide an improved shower filter assembly. It is a more particular object of the present invention to provide a combination shower arm and water filter. It is a further object of the present invention to provide a compact combination shower arm and water filter that takes up a minimum of space. It is yet another object of the present invention to provide a compact combination shower arm and water filter that replaces an existing shower arm and, if used, a shower filter. It is a still further object of the present invention to provide a combination shower arm and water filter that may be used with a separate or integrally formed showerhead. It is yet a still further object of the present invention to provide a filtered shower arm that has a body with an integrated shower arm and a hollow internal chamber for holding a removable filter cartridge for use with a separate or integrally formed showerhead to replace a separate shower arm and shower filter.

In accordance with one aspect of the present invention there is provided a filtered shower arm for a shower that includes an integrated housing having a body with a shower arm and a removable water filter held in a chamber in the body. The combined shower arm and water filter of the present invention may be connected to or form part of any available showerhead and is connected to a water source behind or in a shower wall.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a combination shower arm and water filter assembly.

Figure 11:
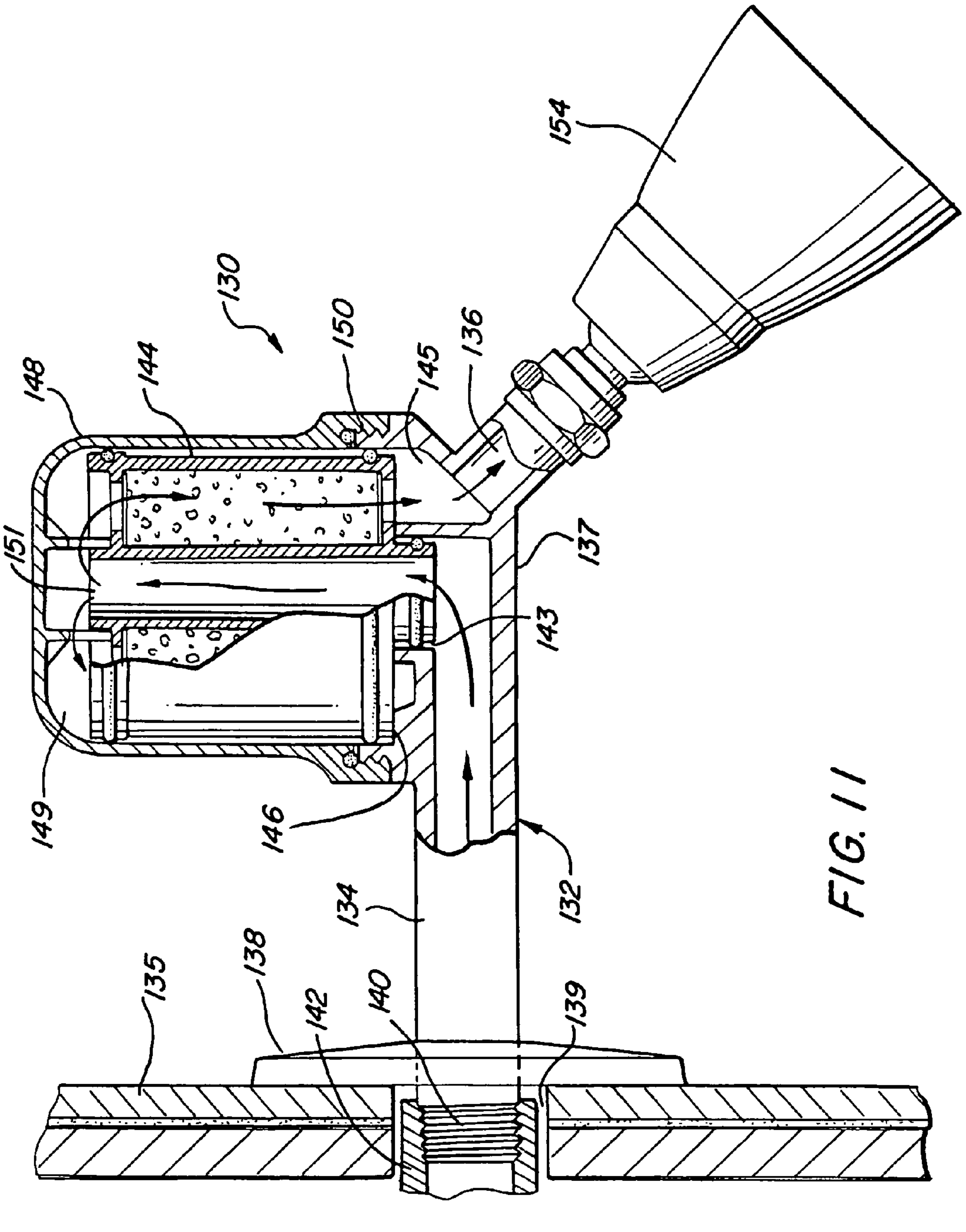
FIG. 11 is a partial cross sectional view of the embodiment shown in FIG. 10, connected to a water line behind a shower wall.

The combination shower arm and water filter assembly of the present invention replaces the usual shower arm coming out of a shower wall and a separate shower filter and shower head or combination showerhead and filter. The combination shower arm and water filter assembly is normally screwed or otherwise secured to a plumbing connection in or behind a shower wall (as shown in FIG. 11), in the same manner as currently available separate shower arms.

Figure 1:
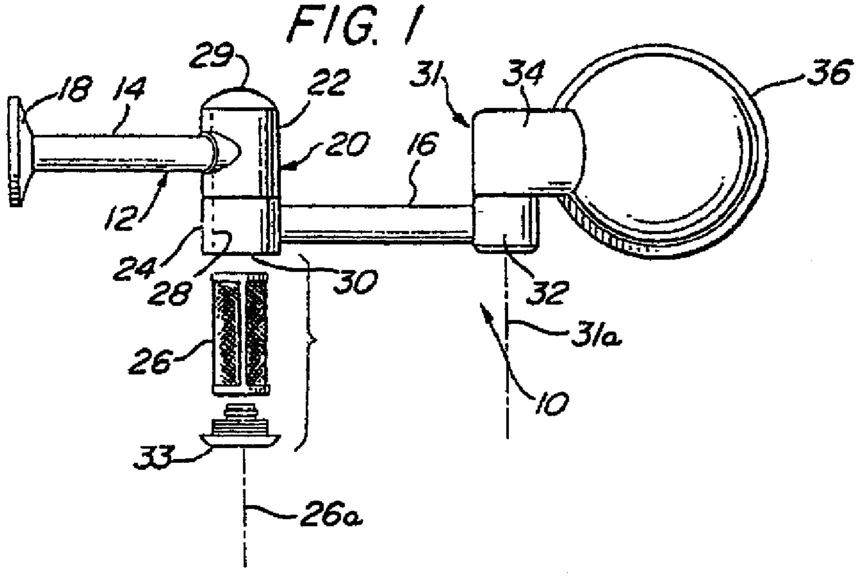
FIG. 1 is a top plan view, partially exploded, of a first embodiment of a combination shower arm and water filter assembly of the present invention.
Figure 2:
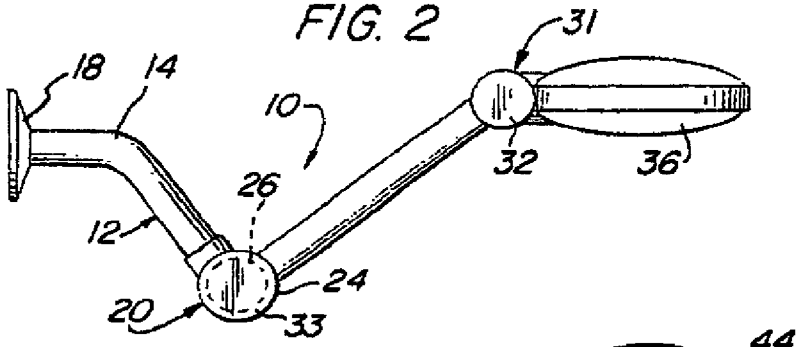
FIG. 2 is a side elevational view of FIG. 1.

Turning now to the drawings, FIGS. 1 and 2 illustrate a first embodiment of a combined shower arm and filter assembly 10 of the present invention. The combined shower arm and filter assembly 10 has a multi-component or multi-piece body or housing 12 which is used to replace the normal shower arm coming out of a shower wall, not shown.

As shown, the body 12 includes a first hollow arm 14 and a hollow second arm 16 that acts as an extension of the first arm. A wall cover 18 is shown on arm 14 at an inlet, which inlet has a threaded end, not shown, for connection to a plumbing connection in or behind a shower wall, not shown. The arms 14, 16 are movably held together in any desired manner, as by means of a holding portion or joint 20, comprising movable portions 22, 24 that allow the arms 14, 16 to move or rotate with respect to each other. The movable portions 22, 24 are preferably formed transverse or at a 90° angle to the arms 14, 16, when looking at the drawings. A water filter assembly or element 26 is removably held in a hollow chamber 28, having a closed end 29, formed between the movable portions 22, 24. The filter element 26 defines filter longitudinal axis 26*a*. An open end 30 of the hollow chamber is closed, as by means of a cap 33.

An outer or outlet end of the arm 16 includes a further joint 31 comprising a pair of movable hollow portions 32, 34 that allow a showerhead 36, formed integrally with or removably held on the portion 34 or an extension thereof, so as to be moved or rotated when the movable portions 22, 24, 32, 34 are moved with respect to each other. Joint 31 is rotatable about joint axis 31*a*, which is substantially parallel to filter axis 26*a*. Therefore, it can be seen that any size or shape showerhead may be held on the combination body 12 and easily adjusted by articulating or rotating the arms 12, 14 at the joints 20, 31 formed by the movable hollow portions 22, 24, 32, 34.

In use, when the device 10 is properly mounted in a shower, water enters the inlet end of hollow arm 14 and flows into the hollow movable portion 22. Then, depending on the type of filter 26 held in the hollow chamber 28, the water flows axially or radially through the filter into hollow movable portion 24, through arm 16, movable portions 32, 34 and out through the showerhead 36. The filter 26 may be easily rotated or replaced by removing the end cap 33, to prolong the life of the filter and/or improve the efficiency of the device 10.

The combined shower arm and filter assembly of the present invention may take any number of different configurations, and examples of different embodiments thereof are described herein.

Figure 3:
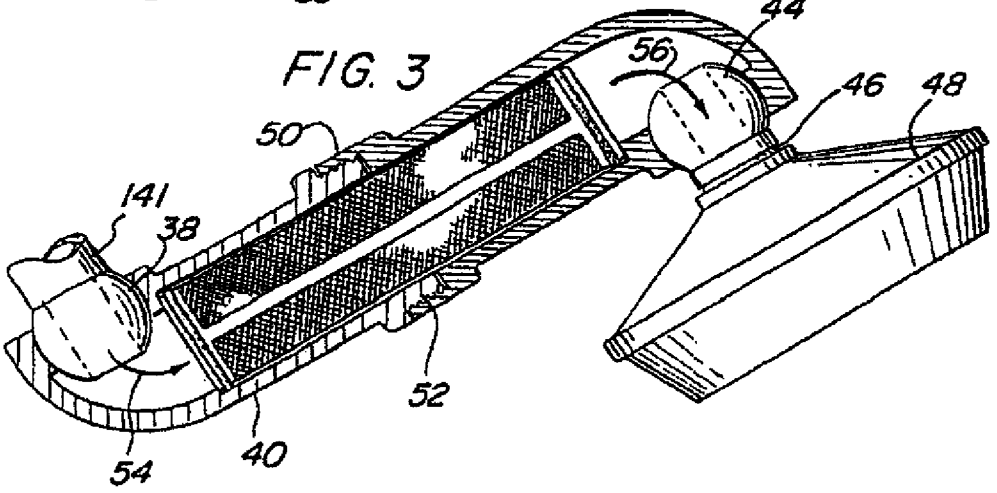
FIG. 3 is a side elevational view, partially in cross-section, of a second embodiment of the present invention.
Figure 4:
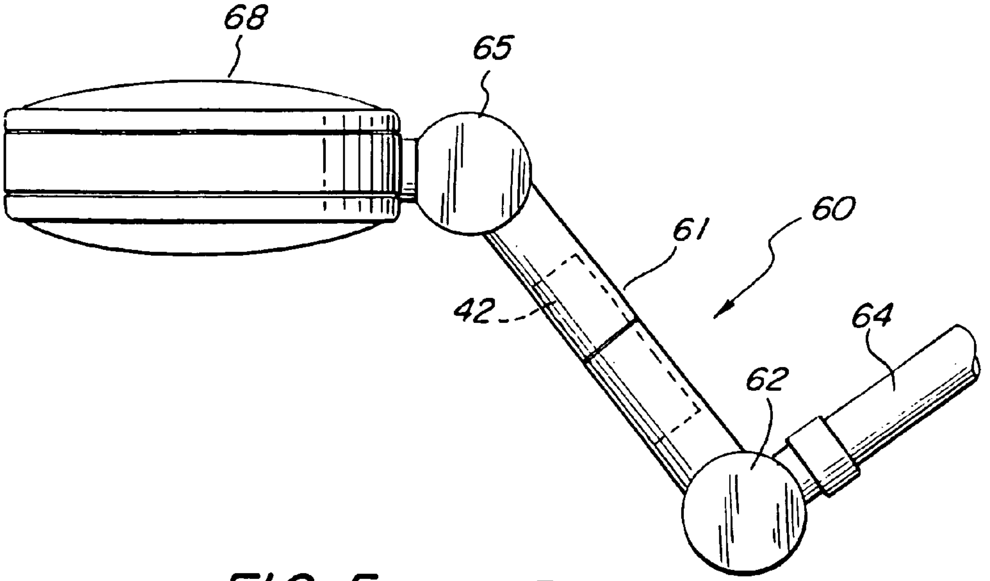
FIG. 4 is a side elevational view of a third embodiment of the present invention.
Figure 5:
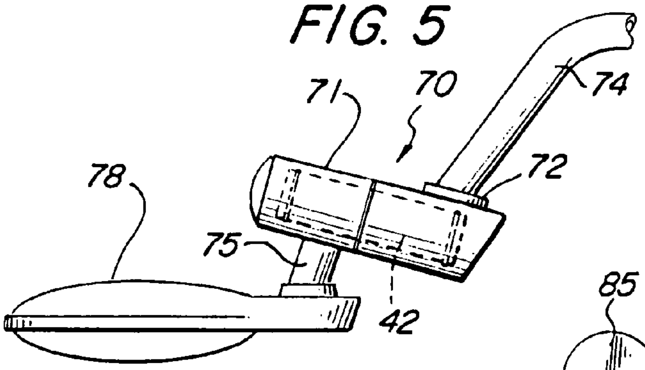
FIG. 5 is a side elevational view of a fourth embodiment of the present invention.
Figure 6:
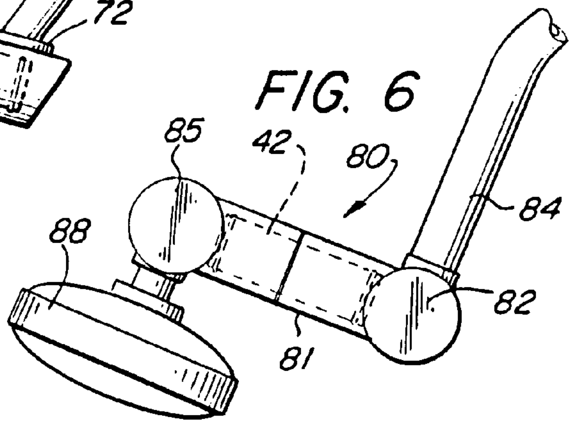
FIG. 6 is a side elevational view of a fifth embodiment of the present invention.
Figure 7:
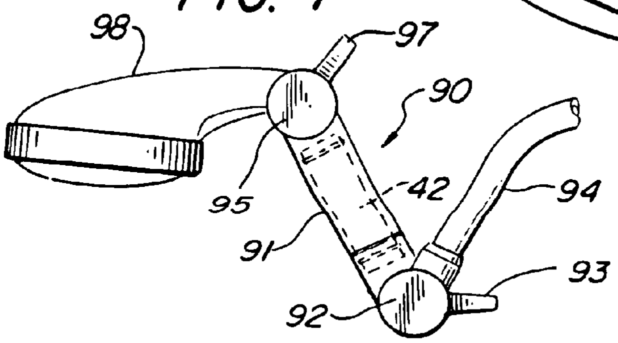
FIG. 7 is a side elevational view of a sixth embodiment of the present invention.

A second embodiment of a device 37 is shown in FIG. 3. The device 37 has an arm 141 that may include a ball, swivel or other movable joint 38 connected to an arm 40 having a water filter assembly or element 42 held therein. A further ball, swivel or other movable joint 44 is connected to arm 40, after filter 42. The movable joint 44 includes an outer end 46 having a showerhead 48 formed integrally therewith, or removably mounted thereto, as by means of a threaded end. The arm 40 is comprised of two portions connected or coupled together, for example, by externally threaded portions 50, 52, to enable the filter 42 to be easily removed for reversal or replacement.

In use, when the device 37 is properly mounted in a shower, water enters the inlet end of hollow arm 141 and flows in the direction of arrow 54 to the hollow internal portion of arm 40, axially through the filter 42 held in the arm 42, and then in the direction of arrow 56 through the ball or swivel joint 44 and out through the showerhead 48.

Third through sixth embodiments of the invention are illustrated by devices 60, 70, 80 and 90, similar to the device 37, as shown in FIGS. 4-7. These devices 60, 70, 80 and 90 have multi-piece bodies or housings comprising first arms 64, 74, 84, 94 for replacing a shower arm. The first arms 64, 74, 84, 94 end in a first ball, swivel or other movable joint 62, 72, 82, 92 connected to second arms 61, 71, 81, 91 having any desired shape or configuration with a water filter assembly or element 42 held therein. The ball, swivel or other movable joint 92 may include a finger or handle 93 to aid in moving the joint, and/or for locking the joint in a desired position.

A further or second ball, swivel or other movable joint 65, 75, 85, 95 is connected to the second arms 61, 71, 81, 91 to allow a showerhead 68, 78, 88, 98 connected thereto to be movable with respect to its respective arm 61, 71, 81, 91, while these second arms are movable with respect to first arms 64, 74, 84, 94. The ball, swivel or other movable joint 95 may also include a finger or handle 97 to aid in moving the joint, and/or for locking the joint in a desired position. The arms 61, 71, 81, 91 may be made in one or two pieces, but are shown as being comprised of two portions connected or coupled together in any desired manner, for example, by internal or external threaded portions, to enable the filter 42 to be easily removed for reversal or replacement.

Figure 8:
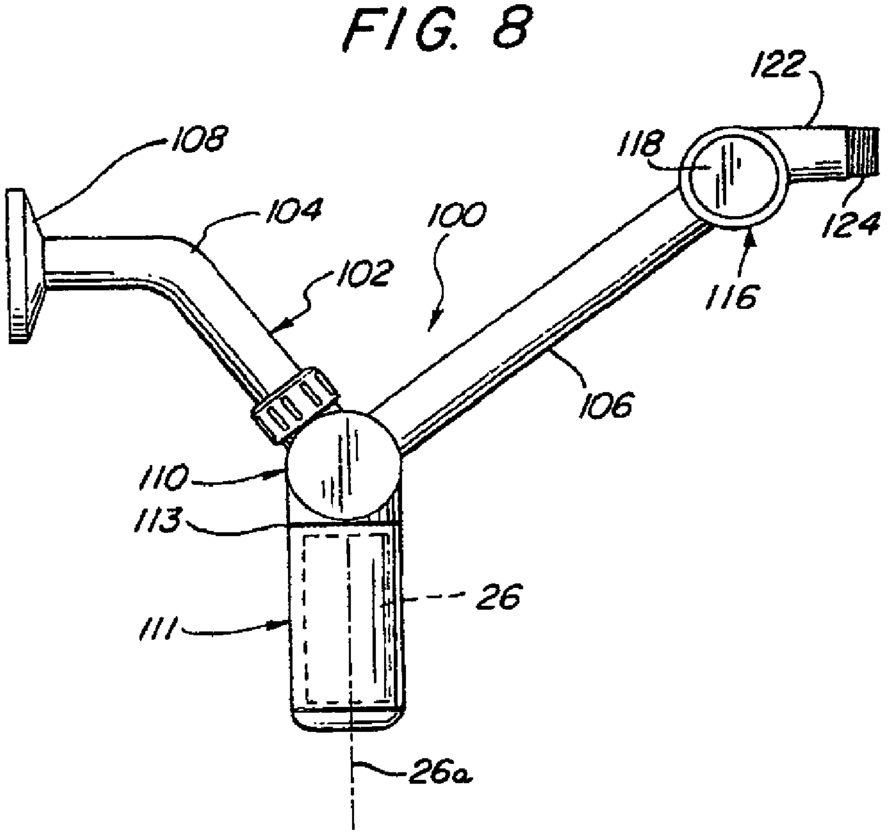
FIG. 8 is a side elevational view of a seventh embodiment of the present invention.
Figure 9:
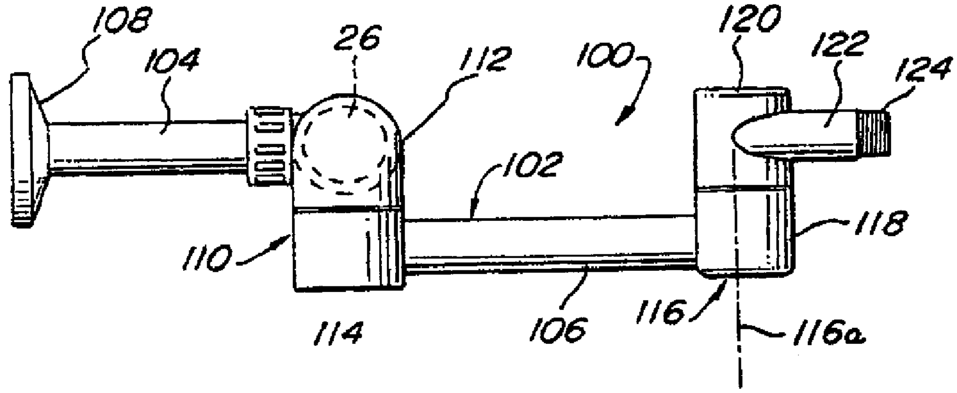
FIG. 9 is a side elevational view of FIG. 8.

Turning now to FIGS. 8 and 9, there shown is a seventh embodiment of a combined shower arm and filter assembly 100 of the present invention. The combined shower arm and filter assembly 100 has a multi-piece body or housing 102 which is used to replace the normal shower arm coming out of a shower wall, not shown. The body 102 includes a first hollow arm 104 and a second hollow arm 106. A wall cover 108 is shown on arm 104 at an inlet, which inlet has a threaded end, not shown, for connection to a plumbing connection in or behind a shower wall. The arms 104, 106 are movably held together in any desired manner, as by means of a holding portion or joint 110, comprising hollow movable portions 112, 114. The hollow movable portions 112, 114 allow the arms 104, 106 to move or rotate with respect to each other. The movable portions 112, 114 of the holding portion or joint 110 are preferably formed transversely to or at a 90° angle to the arms 104, 106. A filter holding portion 111 having a filter element 26 removably held in a hollow internal chamber is shown extending downwardly or outwardly from the holding portion or joint 110, and may be connected to either of the movable portions 112, 114, but is preferably fluidly connected to the movable portion 112. The filter holding portion 111 is preferably removably held to the movable portion 112, as by means of a removable connection shown at 113. Water entering the movable portion 112 must pass through the filter 26 before it enters movable portion 114.

An outer or outlet end of the arm 106 includes a further joint 116, comprised of a pair of movable hollow portions 118, 120 that allow a showerhead, not shown, to be secured in a threaded end 124 of a connecting portion 122 formed integrally with or removably held on the movable portion 120. Joint 116 is rotatable about a joint axis 116*a*, which is substantially perpendicular to filter axis 26*a*. Any size or shape showerhead may be removably held on the combination body 102 and easily adjusted by a user by articulating or rotating the arms 104, 106 at the joints 110, 116 formed by the movable hollow portions 112, 114, 118, 120.

Figure 10:
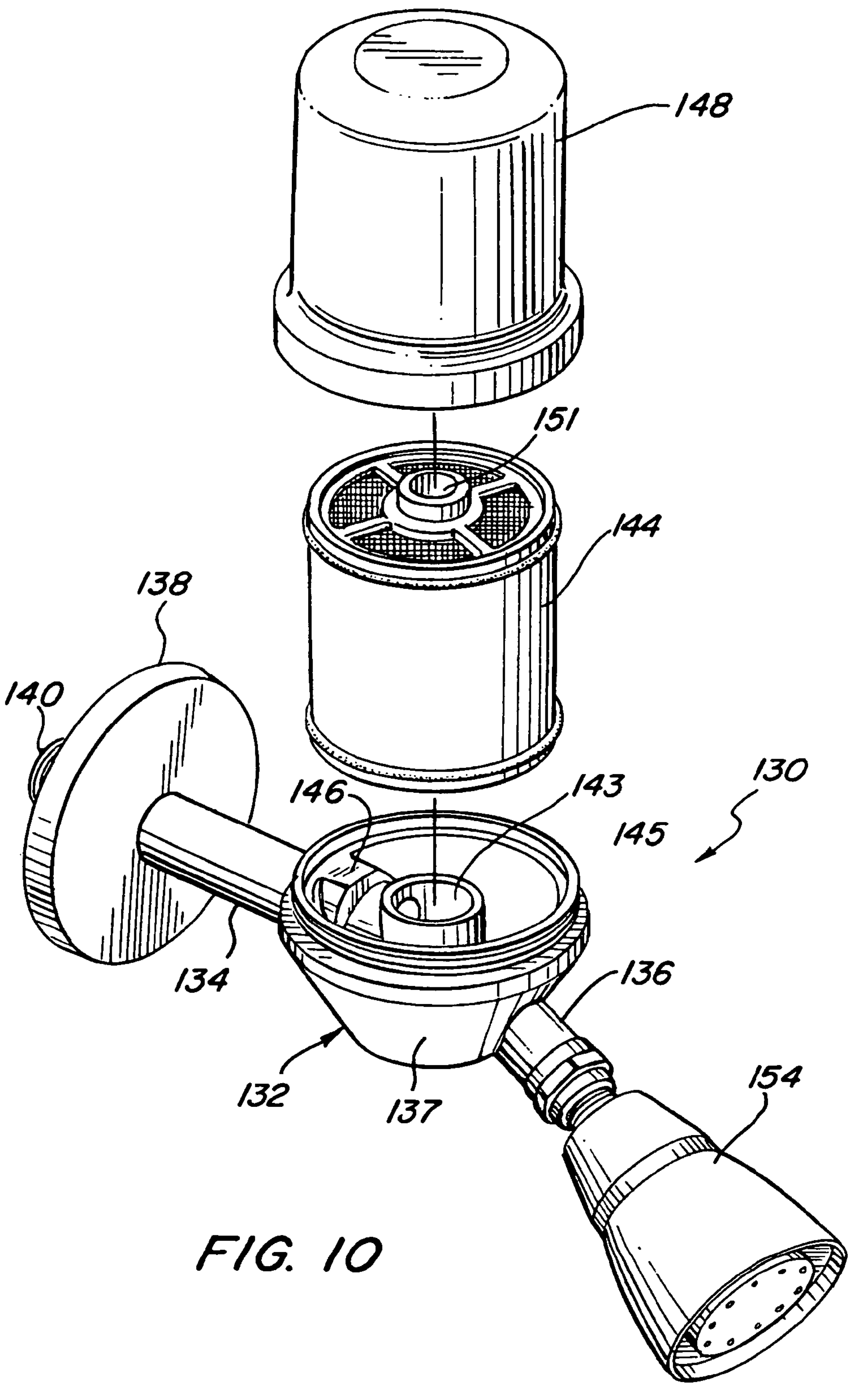
FIG. 10 is an exploded perspective view of an eighth embodiment of a combination shower arm and water filter assembly of the present invention.

Turning now to FIGS. 10 and 11, there shown is an eighth embodiment of a combined shower arm and filter assembly 130.*of* the present invention. The combined shower arm and filter assembly 130 has an integrated or single body or housing 132 which is used to replace the normal shower arm connected to the water supply behind a shower wall 135 and a separate water filter housing or a combination water filter and showerhead. The integrated or single piece body 132 includes a first hollow arm 134 and a second hollow arm 136 connected to and preferably forming a part of a central portion 137. An escutcheon plate or wall cover 138 is shown mounted on hollow arm 134 to cover a passageway or opening 139 formed through the wall 135. A threaded outer end 140 of the first hollow arm 134 is connected to an internally threaded portion of an elbow or the like 142 that is connected to a water pipe (not shown) behind the wall 135.

The central portion 137 preferably forms the lower end of a filter cartridge holding portion and has a central opening 143 formed therein and fluidly connected to interior of the first hollow arm 134. An annular opening 145 is formed in the filter holding portion 137 around the central opening 143. A filter cartridge or element 144 is removably held on the central opening 143 and a lower portion 146 formed in the filter holding portion 137. A cap or cover 148 is removably secured to an upwardly extending annular portion 150 formed on a top surface of the filter holding portion around lower portion 146. The external surface of the upwardly extending annular portion 150 and the lower internal end of the cap or cover 148 may include threads or any other type of holding devices or surfaces for removably holding the cap or cover on the filter holding portion 137 with the filter cartridge or element 144 in position over the central opening 143 (see FIG. 11). In this position, water entering the combined shower arm and filter assembly 130 from a water pipe through the first hollow arm 134 is directed through the central opening 143 into a central passage 151 formed in the filter cartridge or element 144 and into a hollow chamber 149 formed by the interior of the cap 148 and lower portion 146, for passage through filter media 152 held in the filter cartridge or element, before it exits through the annular opening 145 into the second hollow arm 136 and out a showerhead 154.

It, therefore, can be seen that the present invention provides an improved less cumbersome, easy-to-install, lower cost combination shower arm and water filter having an integrated design, with a housing containing a shower filter that may be used with any available showerhead.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A combination shower arm and water filter, comprising;

a body having an inlet arm connected to a central portion and an outlet arm connected to the central portion, the central portion defining a hollow chamber;

the inlet arm having a threaded outer end adapted to be secured to a water inlet in extending through or behind a shower wall;

the outlet arm having an outlet end adapted to be secured to a showerhead;

a filter cartridge removably held in the hollow chamber, the filter cartridge being removable from the hollow chamber as the inlet and outlet arms remain in mechanical communication with each other; and a rotatable joint connecting the body central portion to the outlet arm, the filter cartridge being insertable into the hollow chamber through an aperture formed in the rotatable joint.

2. The combination shower arm and water filter of claim 1 further including a cap removably attached to the central portion, the cap and the central portion collectively defining the hollow chamber.

3. The combination shower arm and water filter of claim 1 wherein at least one of the inlet and outlet arms is pivotally connected to the central portion.

4. The combination shower arm and water filter of claim 3 wherein the inlet and outlet arms are each pivotally connected to the central portion.

5. The combination shower arm and water filter of claim 1 wherein the inlet and outlet arms extend along respective ones of a spaced, generally parallel pair of axes.

6. The combination shower arm and water filter of claim 1 wherein the filter cartridge is removable as the inlet and outlet arms remain in fluid communication with each other.

7. The combination shower arm and water filter as recited in claim 1 wherein the filter cartridge defines a filter longitudinal axis, and the outlet arm is rotatable about the filter axis.

8. A combination shower arm and water filter, comprising;

a body having an inlet arm fluidly connected to a central portion and an outlet arm fluidly connected to the central portion;

the central portion having a cap removably attached thereto, the central portion and the cap collectively defining a hollow chamber;

the inlet arm having a threaded outer end adapted to be secured to a water inlet extending through or behind a shower wall;

the outlet arm having an outlet end adapted to be secured to a showerhead;

a filter cartridge held in the hollow chamber, the cap being removable as the inlet and outlet arms remain in mechanical communication with each other;

the body being supported by engagement of the inlet arm to the water inlet;

and a rotatable joint connecting the body central portion to the outlet arm, the filter cartridge being insertable into the hollow chamber through an aperture formed in the rotatable joint.

9. The combination shower arm and water filter of claim 8 wherein the central portion includes a central opening fluidly connected to the inlet arm and an annular opening fluidly connected to the outlet arm.

10. The combination shower arm and water filter of claim 9 wherein the annular opening is formed around the central opening.

11. The combination shower arm and water filter of claim 10, wherein the filter cartridge is removably held on the central opening.

12. The combination shower arm and water filter of claim 11 further comprising a cap removably engaged to the central portion and enclosing the hollow chamber.

13. The combination shower arm and water filter of claim 12, further including threads formed on an external surface of the central portion and a lower internal end of the cap for removably holding the cap on the central portion with the filter cartridge in position over the central opening.

14. The combination shower arm and water filter of claim 13, further including a showerhead on the outlet arm.

15. The combination shower arm and water filter of claim 14 wherein the showerhead is removably secured to the outlet arm.

16. The combination shower arm and water filter of claim 8 wherein the cap is removably secured to an upwardly extending annular portion formed on a top surface of the central portion.

17. The combination shower arm and water filter of claim 16, further including threads formed on an external surface of the upwardly extending annular portion and a lower internal end of the cap for removably holding the cap on the central portion with the filter cartridge in position over the central opening.

18. The combination shower arm and water filter of claim 8, further including a showerhead on the outlet arm.

19. The combination shower arm and water filter of claim 18 wherein the showerhead is removably secured to the outlet arm.

20. The combination shower arm and water filter of claim 8 wherein the filter cartridge is removable as the inlet and outlet arms remain in fluid communication with each other.

21. The combination shower arm and water filter as recited in claim 8 wherein the filter cartridge defines a filter longitudinal axis and the output arm is rotatable about an axis perpendicular to the filter axis.

22. The combination shower arm and water filter as recited in claim 12 wherein the cap is screw engageable to the body.

23. The combination shower arm and filter as recited in claim 8 wherein the filter cartridge defines a filter longitudinal axis, and the output arm include a joint connected to the output arm, the joint being rotatable about an axis substantially parallel to the filter axis.

* * * * *